US010387453B1

(12) United States Patent
Norton et al.

(10) Patent No.: US 10,387,453 B1
(45) Date of Patent: Aug. 20, 2019

(54) DATABASE VIEWS FOR GRAPHS USING DYNAMIC SUBGRAPHS

(71) Applicant: EMC IP Holding Company LLC, Hopkinton, MA (US)

(72) Inventors: Jeffrey Norton, Laguna Niguel, CA (US); Mark D Malamut, Dana Point, CA (US); Erik S Hansen, Mission Viejo, CA (US); Jennifer Starling, Lake Forest, CA (US); Adam Brenner, Lake Forest, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 324 days.

(21) Appl. No.: 15/197,580

(22) Filed: Jun. 29, 2016

(51) Int. Cl.
  *G06F 16/28* (2019.01)
  *G06F 16/901* (2019.01)
(52) U.S. Cl.
  CPC ........ *G06F 16/285* (2019.01); *G06F 16/9024* (2019.01)
(58) Field of Classification Search
  None
  See application file for complete search history.

(56) References Cited

U.S. PATENT DOCUMENTS

| 5,450,535 A * | 9/1995 | North ................. G06T 11/206 345/440 |
| 2008/0005218 A1* | 1/2008 | Kounavis ............. G06F 7/523 708/620 |
| 2008/0201339 A1* | 8/2008 | McGrew ............... G06Q 50/18 |
| 2013/0124574 A1* | 5/2013 | Brettin .............. G06F 17/30958 707/798 |
| 2015/0227602 A1* | 8/2015 | Ramu ............... G06F 17/30575 707/634 |
| 2016/0124665 A1* | 5/2016 | Jain ....................... G06F 3/0619 711/162 |
| 2016/0179887 A1* | 6/2016 | Lisonbee .......... G06F 17/30958 707/718 |
| 2017/0177740 A1* | 6/2017 | Abaya ............... G06F 17/30958 |

OTHER PUBLICATIONS

Jayanta Mondal et al, "CASQD: Continuous Detection of Activity-based Subgraph Pattern Queries on Dynamic Graphs", DEBS'16, Jun. 20-24, 2016 Irvine CA, USA. ACM 2016 12 pages.*

* cited by examiner

*Primary Examiner* — Uyen T Le
(74) *Attorney, Agent, or Firm* — Staniford Tomita LLP

(57) ABSTRACT

Embodiments for a method of implementing dynamic subgraphs in a graph database by defining vertices of a subgraph descriptively in such a way that the original intent of the content is preserved while the subgraph itself is changing. A database process preserves a "view" of the database as a stored query which will define a subgraph members while the subgraph members are modified, and as opposed to a method in which edges are induced from their vertices to be included in the subgraph, by defining the content of a subgraph descriptively using a database view, vertices which are new and should be contained in the subgraph will automatically be included.

19 Claims, 5 Drawing Sheets

DATABASE VIEWS FOR GRAPHS USING DYNAMIC SUBGRAPHS

TECHNICAL FIELD

Embodiments are generally directed to database processing, and more specifically to dynamically defining graph subsets to preserve subgraph content while the graph is changing.

BACKGROUND

A graph database is a database that uses graph structures for semantic queries with nodes, edges and properties to represent and store data. The key to graph databases is that edges represent relationships that directly relates data items in the store, as opposed to conventional relational databases, where links between data are based on the data itself, and related items are gathered by searching for this data within the store. Graph databases are designed to allow simple and rapid retrieval of complex hierarchical structures without requiring complex queries. Graph database systems use the fact that meaningful patterns emerge when examining the connections and interconnections (edges) of nodes and their pertinent information (properties). Graph databases are used in a wide variety of data processing applications, such as social network analysis, communications, path finding, and in computer network applications to analyze characteristics such as mapping dependencies and the like. In this application, networks of computers and hardware can be modeled as graphs to find components with many dependents that may be potential weak points or vulnerabilities. Other dependency networks, for example corporate or investment structures can be mapped in a similar manner.

Graph databases are powerful tools for modeling relationships between related objects. In one application, graphs are used to model computer and storage networks in large-scale enterprise computer systems. Subgraphs, which are a connected subset of a graph are convenient for grouping items by relationship or type. FIG. 1A illustrates example subgraphs of a graph database and an associated subgraph. Each subgraph 102 and 104 stores data in their respective elements, where records in the graph nodes (nodes are also referred to as vertices) are connected through typed, directed arcs, called edges that represent relationships. Each node and relationship can have named attributes referred to as properties, and a label is a name that organizes nodes into groups. For the subgraphs, edge membership is by induction, that is, the edges connecting the nodes in each subgraph are also included in the subgraph definition.

In present graph databases, subgraphs are most often defined using a static set of objects, and present graph databases generally do not store subgraphs. As the graph changes due to changes in the underlying objects (e.g., network), these static definitions become invalid. FIG. 1B illustrates an example subgraph in a directional graph (edges have direction) that goes through several iterations, and a process that induces edges in the subgraph. As shown in FIG. 1B, a subgraph is defined with respect to the connectivity to the lead node (vertex) 1, such that all vertices go "out" from this node. Example changes to the subgraph are shown through panels 105, 107, and 109. As shown in this example, subgraph 105 becomes subgraph 107 through the addition of node 4, and then it becomes subgraph 109 through the deletion of node 6. Table 110 of FIG. 1B shows how edges are induced from their vertices to be included in the subgraph 109. The present traditional method is thus to explicitly define the vertices of a subgraph and induce the edges in the subgraph. The major issue with this approach is that if vertices are added to the graph which conceptually should be in the subgraph, they must be added manually or "by hand". Furthermore, there are also typically subgraphs of interest where edges cannot be induced, such as where there are vertices two or more edges away from another vertex in the subgraph. Present methods of subgraph processing for graph databases do not easily or comprehensibly accommodate dynamically changing subgraphs.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, ExtremeIO, and Isilon are trademarks of EMC Corporation. VMAX is a trademark of VMware Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1A:
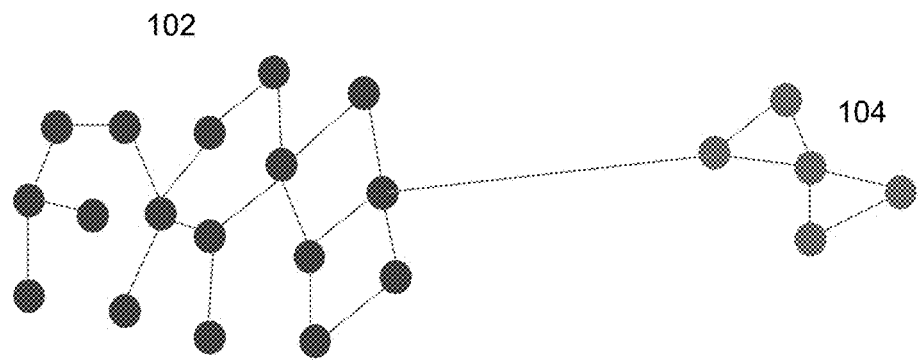
FIG. 1A illustrates example subgraphs of a graph database.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Figure 1B:
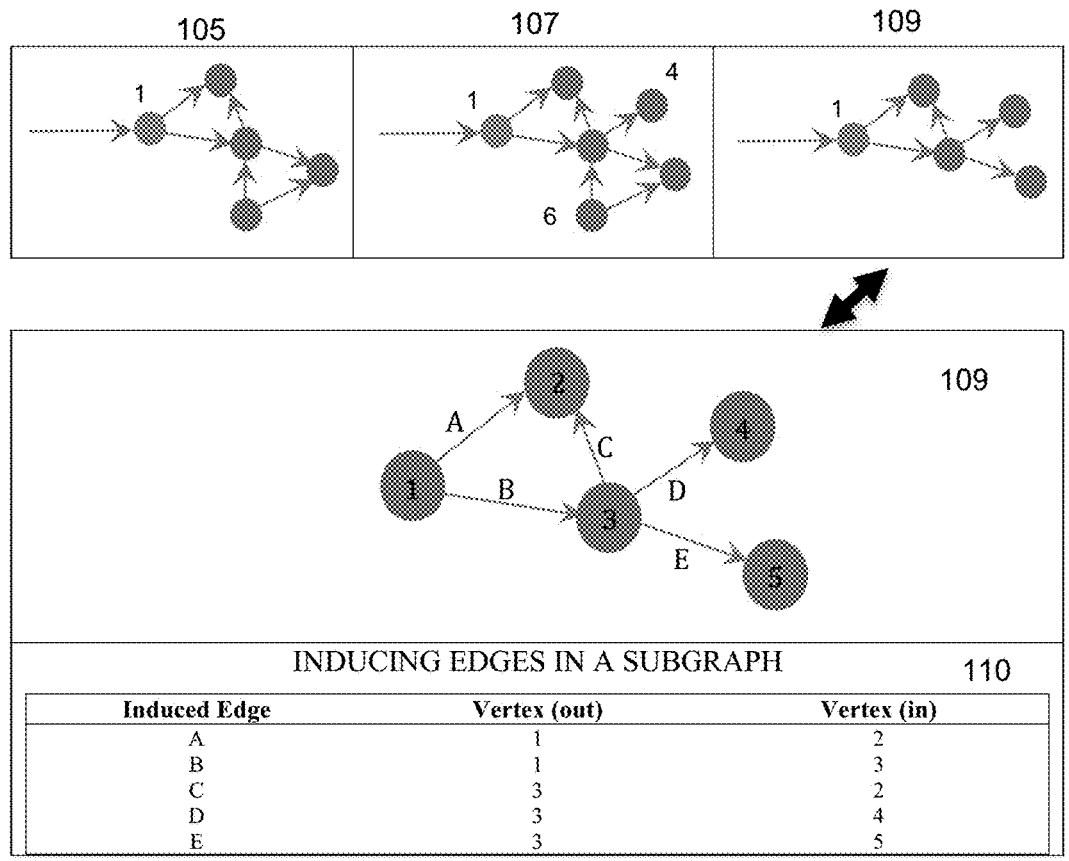
FIG. 1B illustrates an example inducing edges in a subgraph that goes through dynamic state changes.

Embodiments are directed to a processing component in or associated with a server computer used to store a dynamic definition of a subset of a graph (a subgraph) such that the original intent of the subgraph content (vertices/edges) is preserved while the graph is changing. Embodiments are also directed to a process that stores, in a graph database, a static definition of a subgraph where actual vertices are enumerated in a subgraph. These embodiments may be generally described with respect to graph databases used for computer network modeling, however embodiments are not so limited. Graphs used to model networks can become very large and difficult to both visualize and process with graph algorithms such as shortest path traversal. Therefore, it is convenient to take a small, connected, portion of the graph called a subgraph and visualize and operate on the subgraph. As described above with respect to FIG. 1B, present systems typically define the vertices of a subgraph and induce the edges in the subgraph, and the main disadvantage here is that if vertices are added to the graph that should also be in the subgraph, they must be added manually.

To remedy this issue, embodiments include a method to dynamically model subgraphs such that they are always valid and correct at any arbitrary point in time by dynamically defining subgraphs similar to a "database view" or query which maintains the intent of the original subgraph definition even as the graph members change over time. Such embodiments define the content of a subgraph descriptively using a graph description or traversal language, such that vertices that should be contained in the subgraph will be automatically included. In this way, the vertices in the subgraph are defined descriptively in such a way that the original intent of the content is the subgraph is preserved even while the graph itself is changing. By defining the content of a subgraph descriptively (using a graph description or graph traversal language), it automatically includes vertices that are new and should be contained in the subgraph. Subgraphs (or the database views) are named and the description is stored in the database. Embodiments thus take advantage of the fact that it is generally sufficient to define the subgraph by enumerating the nodes in the subgraph. The process stores queries that express subgraphs. Thus, the language of the query comprises subgraphs that are stored and this allows the process to express subgraphs that are changing dynamically.

To capture a subgraph in time (i.e., a snapshot of the subgraph), embodiments include a method to evaluate the dynamic view of the subgraph into a static view by saving all the vertices explicitly into the new subgraph at that point in time. If any vertices are deleted, those vertices will also be removed from the static view subgraph. Another variation is to create composite subgraphs where the subgraph is defined as the union of several subgraphs, in a more "dynamic" implementation. Both dynamic and static versions can be supported to create a system in which there is no need for subgraph management as the graph changes over time, which is generally critical for applications like tracking networks, network connectivity, and relations within the network as the network changes without having to perform explicit searches or inserts. One disadvantage of this approach is that the database view or subgraph may be evaluated lazily on demand. If the subgraph is large and/or the graph that contains it is very large, evaluation may be slow. To remediate evaluation delay, views may be cached with a forced eviction when one or more outgoing edges are added, modified, or deleted from any member vertex.

Subgraph Definitions Using Database Views

In an embodiment, contents of a subgraph are defined descriptively using a database view. In general, a database view on a graph database is a query that defines the members of the subgraph. More specifically, a view is the result set of a stored query on the data users can query just as they would in a persistent database collection object. This pre-established query command is kept in the database dictionary. A view is a virtual table computed or collated dynamically from data in the database when access to that view is requested, and unlike ordinary base tables in a relational database, a view does not form part of the physical schema. Changes applied to the data in a relevant underlying table are reflected in the data shown in subsequent invocations of the view. In general, views provide several advantages over tables, such as: representing a subset of the data contained in a table, joining and simplifying multiple tables into a single virtual table, acting as aggregated tables, and hiding the complexity of data. A database management system using database views may include a Microsoft SQL server, or similar database server.

With respect to how the process handles the language of the query. Descriptions of subgraphs can be quite complex. For that reason, queries must be flexible in their construction; that is, the query evaluator must handle different methods of describing subgraph elements. For example, a graph traversal language, such as the Gremlin description language provides a method to describe a set of vertices and edges that are treated as a subgraph. Other methods may also be used to describe a set of vertices and edges. For example, a set of vertices can be enumerated directly, that is, a static definition of the vertices with the edge membership in the subgraph is induced. Another approach is to define a set of vertices and edges algorithmically. For example, a shortest path algorithm defines a subgraph, which consists of the two vertices and the set of vertices (and edges) that describe a shortest path. It should be noted that it is possible to have multiple shortest paths of the same length. Each of these different "phrases" defines a subgraph, which is either static or dynamic. These subgraphs may be combined using set operators such as union, intersection, and difference to create the desired subgraph. When dynamic queries are utilized, then the composite subgraph is dynamic and changes appropriately as the underlying graph changes.

As stated above, in an embodiment, the query to be used describes the subgraph and may use a graph traversal language such as Gremlin developed by the Apache Software Foundation, or any other appropriate graph traversal language. Graph traversal (also known as graph search) refers to the process of visiting (checking and/or updating) each vertex in a graph. A graph traversal language allows the query to specifically choose vertices and by induction edges which have certain relationships to some vertex. There are instances however where the graph traversal languages are too complex and awkward or simply cannot express the subgraph.

As an example, the Gremlin language can be represented in any host language that supports function composition and function nesting. The steps are the primitives of the Gremlin graph traversal machine. They are the parameterized instructions that the machine ultimately executes. These steps are sufficient to provide general purpose computing and what is typically required to express the common motifs of any graph traversal query.

Following are certain example database views to show how complex and rich subgraphs can be. Implementations of these views are provided later in the description below.

Example 1

V(24)+V(24).outV( )—The subgraph includes Vertex 24 and all vertices connected to it by an "out" edge, that is, an edge which starts at Vertex 24 and ends in the vertices included in the subgraph along with Vertex 24.

Example 2

V(12)+V(12).inV( )—The subgraph includes Vertex 12 and all vertices connected by an "in" edge, that is, an edge which starts at the vertices included in the subgraph and ends at Vertex 12.

Example 3

V(4)+All out vertices—The subgraph includes Vertex 4 and all vertices connected by out edges (but not in edges).

This may be a difficult expression to write using a graph traversal language, but can be implemented with a simple algorithm.

Example 4

V(28)+Out vertices with Property A=x. The subgraph includes Vertex 28 and all out vertices with a property A=x, for example, computer_type='Data Domain'.

Example 5

V(128)+All "out" vertices on edges with Properties B=y and C=z.

In some cases, such as in the examples above, it is likely that there will be vertices which should be included in the subgraph that are not connected by a single edge. In an embodiment, the process includes the concept of a spanning edge that is composed of the edges necessary to connect vertices that cannot be connected using a single edge. This mechanism maintains the requirement that all vertices in a subgraph must be connected by an edge (or spanning edge).

Figure 2:
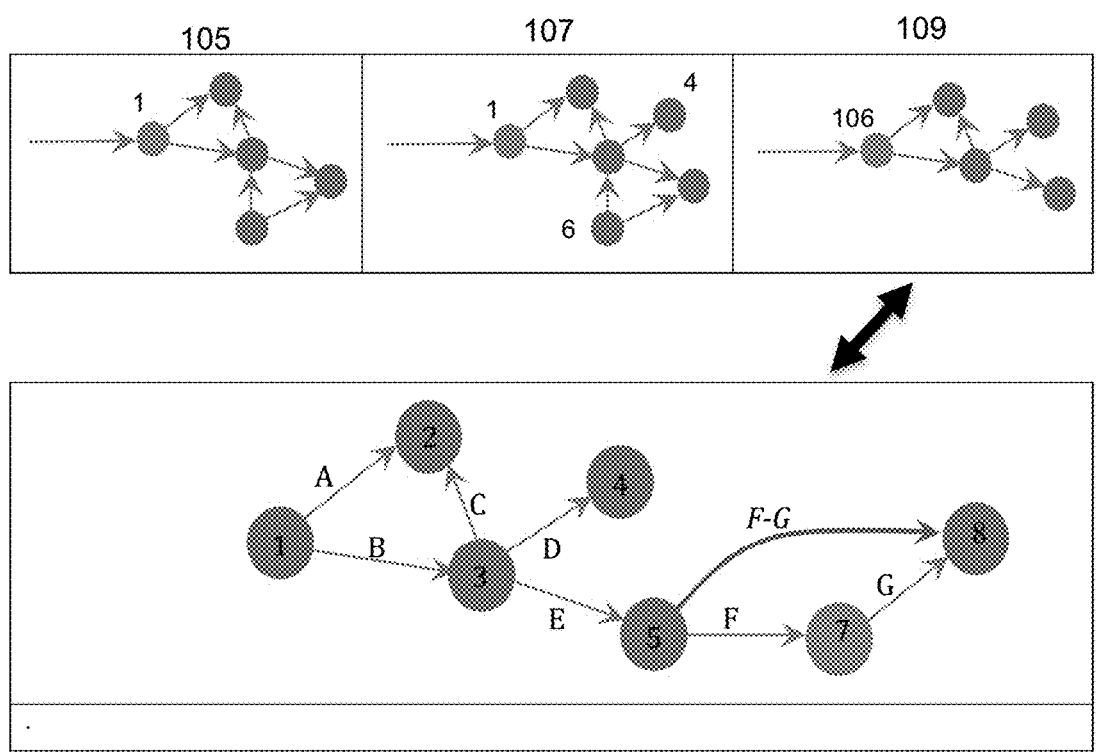
FIG. 2 illustrates a method for defining the content of a subgraph descriptively using a graph description or traversal language, such that vertices that should be contained in the subgraph will be automatically included, under some embodiments.

For cases of vertices that are two or more edges away from another vertex in the subgraph, the spanning edges "spans" over those two or more edges to create a new edge connecting the "lone" vertex into the rest of the subgraph. FIG. 2 illustrates an implementation of a spanning edge, under some embodiments. The top portion of FIG. 2 shows the example change of subgraph 105 through the addition and deletion of nodes (4 and 6) to become subgraph 109. This can be seen through the changes in the members of the subgraph over the time traversing the iteration of subgraph 105 to 109, and as defined with respect to the connectivity of the vertices out from vertex 1. The subgraph 202 at a particular point in time is shown with a new vertex "8" which is included in the subgraph and is reached via node 7 and edge F-G, which is a spanning edge over edges F and G. Note that F-G is not formally defined on the graph, but is defined in the subgraph.

Applications and System Implementation

As stated above, graph databases are generally used in a wide variety of data processing applications (e.g., social networks, communications, path finding, dependency networks, etc.) as they are useful in modeling relationships between related objects. Another possible application of subgraphs is in the area of copy data management. In this case, a subgraph could represent the original document (the entry point), all the derived copies, the owners of those documents, those who have access to the documents and the storage systems where the computers reside. Such a subgraph is typically very dynamic and can be used to address questions on security, compliance, and data protection in a way that is much more difficult to achieve with non-graph solutions. The union of a set of subgraphs of documents originating in a department can be used to analyze security, compliance, and data protection with more accuracy leading to better security and cost controls.

In one application graphs are used to model computer and storage networks in large-scale enterprise computer systems. Modern storage ecosystems may consist of a large, complex, and ever-changing network(s) of various types of computers systems, thus a prominent application for dynamic subgraphs is in managing state of storage networks. In an embodiment, the database system may be implemented in an enterprise-scale network that has both primary storage locations and protection storage locations to provide comprehensive backup and disaster recovery support. The primary storage may be implemented through virtualized storage (e.g., VMware VMAX) and the protection storage could be provided by a Data Domain system (as will be described in greater detail below). Sub-graph representations of these storage resources enable efficient processing of multi-level storage systems that may be in multiple geographic locations. This is particularly useful since protection storage is typically not just one level deep, and it is advantageous to mirror the first level protection storage to Data Domain devices at different locations. For multiple locations, sub-graphs of those regions may be provided within the sub-graph of the data storage, such as for a VMAX (with Data Domain devices at the local site as well as devices many (e.g., 1000) miles away. That way, if an earthquake or other disaster takes out the primary site, all the data is still stored and a VMAX could be started up at a secondary site to keep the company up and running. Having subgraphs that specify which devices are at which location allows the system administrator to quickly get to the information. Certain procedures can then be written to automatically get a secondary system up and running quickly based on the Data Domain devices in the regional subgraph.

Figure 3:
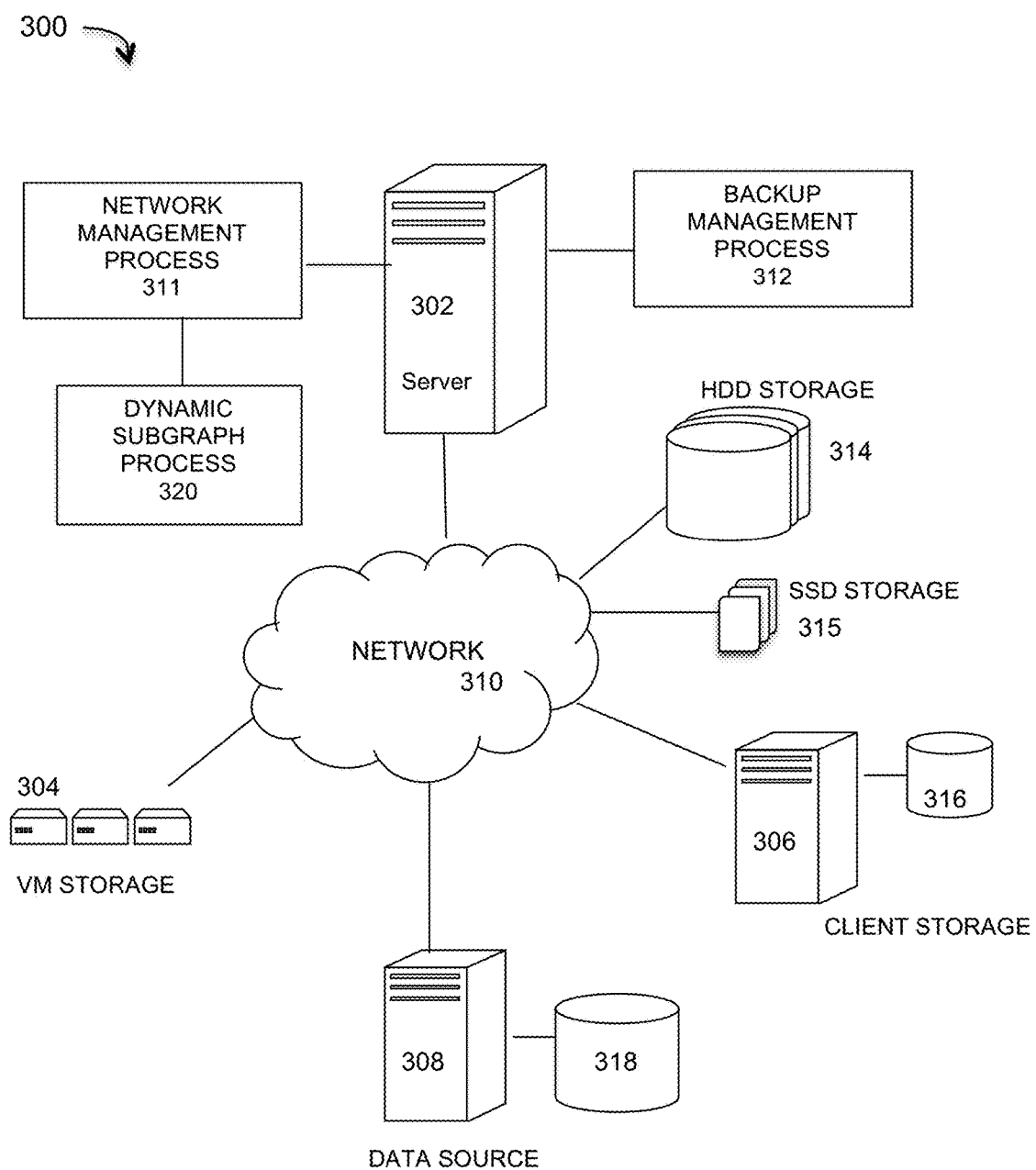
FIG. 3 illustrates a data storage system that implements one or more embodiments of a dynamic subgraph process for graph databases modeling backup system components, under some embodiments.

FIG. 3 illustrates a data storage system that implements one or more embodiments of a dynamic subgraph process for graph databases modeling backup system components, under some embodiments. In system 300, a backup server 302 executes a backup management process 312 that coordinates or manages the backup of data from one or more data sources 308 to storage devices, such as HDD (hard disk drives) 314 or SSD (solid-state drives) 115 network storage, client storage 306, and/or virtual storage devices 304. With regard to virtual storage 314, any number of virtual machines (VMs) or groups of VMs may be provided to serve as backup targets, and the target VMs may also be organized into one or more vCenters (virtual centers) having many VMs each. The network storage devices serve as target storage devices for data backed up from one or more data sources, such as computer 308, which may have attached local storage 318 or utilize networked accessed storage devices 314, 315. Data source 308 represents one of many possible backup agents that initiate save sessions to backup their data to storage devices on the network 300 through the backup server 302 and backup management process 312. The data may be locally sourced or remotely sourced, and the client 308 may initiate save or backup sessions on an automatically scheduled basis or a manually initiated basis. In a data protection scenario, client 108 usually initiates data backups (e.g., full, incremental, differential, etc.) on a regular periodic schedule, such as hourly, daily, weekly, and so on.

The data sourced by the data source may be any appropriate data, such as database data that is part of a database management system. In this case, the data may reside on one or more hard drives (e.g., 318) and may be stored in the database in a variety of formats. One example is an Extensible Markup Language (XML) database, which is a data persistence software system that allows data to be stored in XML format. Another example is a relational database management system (RDMS) that uses tables to store the information. Computer 308 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 302 is coupled directly or indirectly to the network storage devices 314, 315, client storage 316, data sources 308, and VMs 304 through network 310, which may be a cloud network, LAN, WAN or other appropriate network. Network 310 provides connectivity to the various systems, components, and resources of system 300, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 300 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 300 may be stored in any number of persistent storage locations and devices, such as local client storage, server storage (e.g., 318). The backup management process 312 causes or facilitates the backup of this data to other storage devices of the network, such as network storage 314, 315 which may at least be partially implemented through storage device arrays, such as RAID (Redundant Array of Independent Disks) components. In an embodiment network 300 may be implemented to provide support for various storage architectures such as storage area network (SAN), Network-attached Storage (NAS), or Direct-attached Storage (DAS) that make use of large-scale network accessible storage devices 314, such as large capacity disk (optical or magnetic) arrays.

For the embodiment of FIG. 3, network system 300 includes a server 302 that executes a data backup process along with a functional component 311 that provides certain network modeling and management processes to define and control the various network resources. The network resources comprising the various servers, clients, data storage devices, and other components may be modeled as a graph in which each resource is a vertex (node). For this embodiment, process 311 includes a graph database process that models system 300 in one or more graph databases. Process 311 may implement a SQL-based database management process to model and manage the network in one or more graph databases. The graph may be defined as a collection of subgraphs for certain functional or organizational component, each of which may further be broken down into subgraphs. For example, sub-networks comprising the network storage devices 314 and/or 315 and 304 may be represented as a graph database with one or more subgraphs. As the network configuration is modified through the addition, deletion, or reassignment of storage devices, the network topography and definition changes. The dynamic subgraph process 320 allows for the subgraphs to be defined descriptively using a database view, so that vertices that are new and should be contained in the subgraph will be automatically included.

In an embodiment, system 300 may represent a Data Domain Restorer (DDR)-based de-duplication storage system, and storage server 302 may be implemented as a DDR De-duplication Storage server provided by EMC Corporation. However, other similar backup and storage systems are also possible. As shown in FIG. 3, certain network resources are virtualized, such as VM storage 304. For this embodiment, an enterprise-class storage system, such as thy: EMC VMAX system may be used, and which integrate with VMware APIs to automate the provisioning of storage for virtual machines across multiple tiers of disk drives, from solid-state to Serial ATA (SATA), and the like. The data storage resources of system 100 may represent data centers or storage centers that are deployed on a very-large scale, such as across a country.

In an embodiment, the backup storage devices of system 100 may be organized or divided into functional classes, such as "primary storage" and "protection storage" where the primary storage could be the VMAX storage and the protection storage could be the Data Domain systems. It should be noted that protection storage is not just one level deep, but multiple levels deep. The system can be configured to mirror the first level protection storage to Data Domain devices at different locations. In this case, the subgraphs of the storage resources are multi-leveled systems that can be at multiple geographical locations. For distributed networks with multiple data/storage center locations, the process provides subgraphs of those regions within the subgraph of the particular data storage resource. For example, a VMAX site with Data Domain devices at the local site, as well as Data Domain devices at other sites thousands of miles away. The process provides the locations of data storage devices through subgraphs that define which devices are where in the entire system, and allows the for efficient and quick disaster recovery processes, such as by allowing data that is stored at a VMAX site to be started up at a secondary site to keep the company up and running, and certain DR processes can be provided to automatically get the initialize the secondary system based on the Data Domain devices in the regional subgraph.

As stated above, system 300 may use different storage architectures such as storage area network (SAN), Network-attached Storage (NAS). Hybrid storage systems consisting of primary NAS and SAN-based storage are often complemented by secondary storage systems such as Data Domain storage systems. Large enterprises may make use of many of these systems, especially as the growth of virtual computing continues to grow. These ever increasingly complex systems present more potential points of failure, so such systems must be evaluated daily to determine that the primary and secondary storage systems are working properly. For example, a VMAX storage solution may be backed up by one or more (likely many) Data Domain systems. In order to guarantee that the data on the VMAX is being properly protected, the following steps must be taken:

(1) Define the VMAX and Data Domain systems as a subgraph representing the set of computers that must be operating;

(2) Walk through the systems regularly (daily or more often) to determine if all components (the VMAX and the Data Domain systems) are working properly; and (3) Compare this result against previous results that will reveal if computers have failed or have been added to the system.

In an example deployment, the system comprising the VMAX and the Data Domain systems may be represented as a subgraph that describes it as the VMAX and all the connected Data Domain systems to which the VMAX is backed up on. In this case, the VMAX is a vertex and each of the Data Domain systems are connected vertices. This makes it possible to monitor the health of the system using dynamic subgraphs. In a specific example network configuration, enterprises may use multiple VMAX or ExtremeIO systems that treat the complete storage network as a graph. In this case, each VMAX, ExtremeIO, Isilon, or other hybrid storage solutions could also look at storage optimization solutions by balancing between subgraphs.

Figure 4:
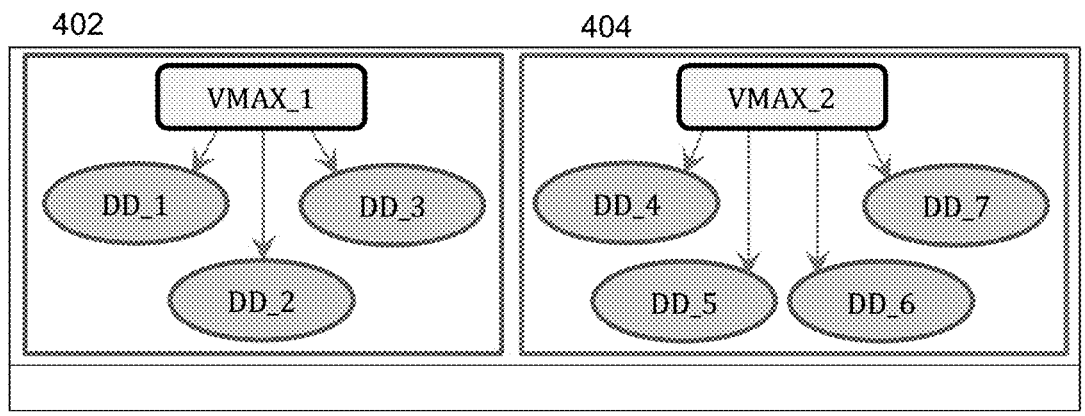
FIG. 4 shows an implementation in which two VMAX block devices being backed up to several "Data Domain" storage devices, under an embodiment.

FIG. 4 illustrates an example implementation in which one or more large block storage device such as a VMAX system may be connected (for replication purposes) to multiple Data Domain storage devices. FIG. 4 shows an implementation in which two VMAX block devices being backed up to several Data Domain storage devices, under an embodiment. As shown in FIG. 4, two VMAX computers denoted VMAX_1 and VMAX_2 are coupled to respective, supporting Data Domain replication devices (DD_x). Each system 402 and 404 comprising the VMAX networks are not static. Any number of conditions may cause the network to change, such as a technology refresh, insufficient storage due to growth demands, or device failure/replacement, and other similar occurrences. Since the networks change, a discovery process is used to detect devices in the network. Typically, this is performed through a management program running on a management server, such as process 311 on server 302. In this case, the server 302 is selected as the entry point (first node) from which the network is defined as everything out from that vertex. For FIG. 4, the two sub-networks 402 and 404 comprising the VMAX computers and their supporting DD replication devices are each treated as a separate subgraph.

Another application of dynamic subgraphs is in security and compliance modeling. For example, consider a set of documents (where the set may consist of only one document). Using ACLs (Access Control Lists), one can identify people that have access to read and/or write to that set of documents. Furthermore, within an enterprise environment where data protection is fully employed, the location of these documents, meaning which computers they reside on, can also be determined dynamically. In an embodiment of the dynamic subgraph process, this is called: subgraph D({documents}), where {documents} is the set of documents to be tracked.

Figure 5:
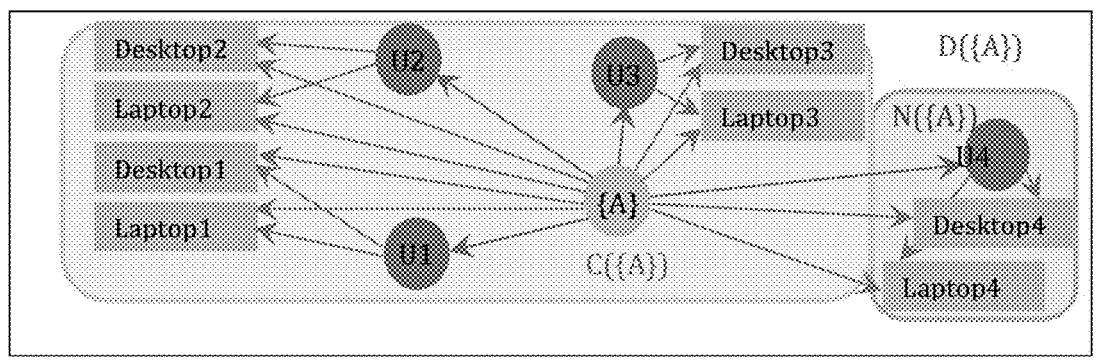
FIG. 5 illustrates an example implementation of dynamic subgraphs for security and compliance modeling under some embodiments.

A strict subgraph may be defined via policy P{documents} which defines the group of users and computers which should be connected, i.e., users having access and machines on which the documents may reside). This is the control subgraph: C({documents}). This produces the following compliance relationship:

$$D(\{documents\})-C(\{documents\})=N(\{documents\}),$$

where N({documents}) are users or computers not in compliance with policy P{documents}. If N({documents})=0, then the system is in compliance with policy P{documents}. An example of this implementation is illustrated in FIG. 5. As shown in FIG. 5, a control group C({A}) for Document set {A}, the current network of users/computers as a subgraph D({A}) and the set of non-compliant users and computers N({A}). Ui are the users and the square boxes are computers. The graph edges show the relationships between the document set, users, and computers that can be derived from the company's Active Directory Server and from backup metadata.

Figure 6:
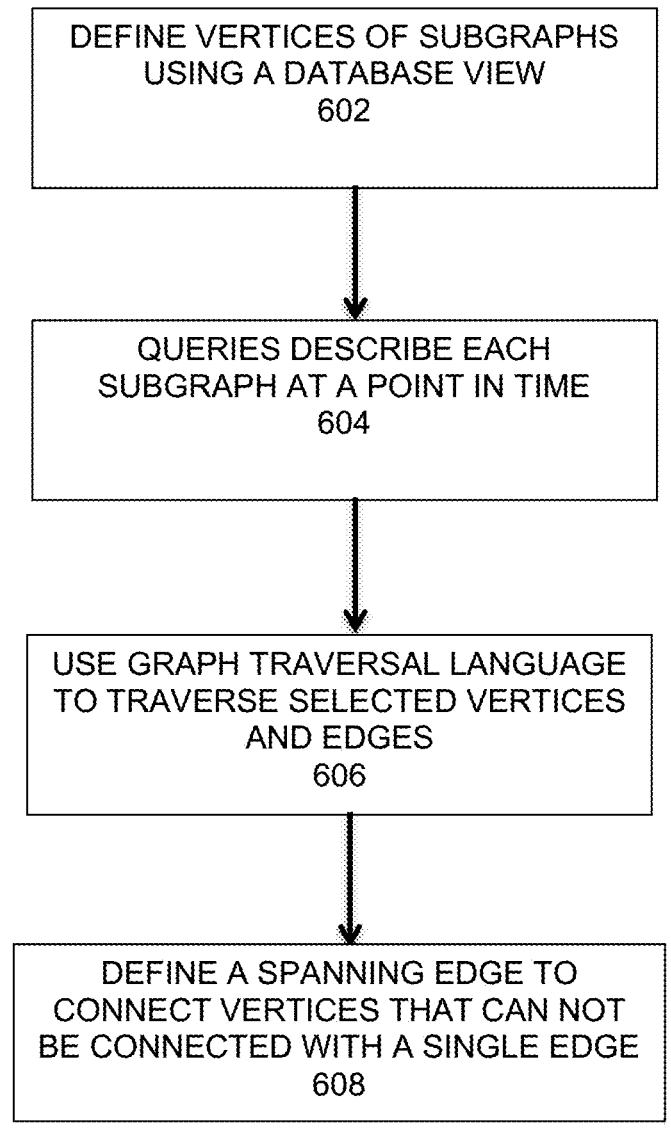
FIG. 6 illustrates a method of implementing dynamic subgraphs in a graph database having vertices connected by edges under some embodiments.

FIG. 6 illustrates a method of implementing dynamic subgraphs in a graph database having vertices connected by edges. Each subgraph is a portion of a graph database that comprises a plurality of vertices and edges to store database data, wherein records are stored in the vertices, and the edges comprise typed, directed arcs, and further wherein each vertex and edge has named attributes referred to as properties. As shown in FIG. 5, the overall method comprises defining the vertices of the subgraphs in the graph database using a database view, block 602. Queries to be used describe the subgraph at a specific point in time, block 604. As shown in block 606, a graph traversal language is used to selected vertices and edges that have certain defined relationships to some vertices. The method may further comprise defining a spanning edge comprising edges necessary to connect vertices that are not capable of being connected using a single edge, block 608.

Embodiments described herein thus describe a method by which the vertices of a subgraph are defined descriptively in such a way that the original intent of the content is preserved while the subgraph itself is changing. In the method, a database process preserves a "view" of the database as a stored query which will define a subgraph members while the subgraph members are modified, and as opposed to a method in which edges are induced from their vertices to be included in the subgraph (e.g., FIG. 1B), by defining the content of a subgraph descriptively using a database view, vertices which are new and should be contained in the subgraph will automatically be included.

In this specification, these implementations, or any other form that the invention may take, may be referred to as techniques. In general, the order of the steps of disclosed processes may be altered within the scope of the invention. Some embodiments of the invention involve automated backup related processes executed in a distributed system or other database processing operations that are performed over a distributed network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of implementing dynamic subgraphs in a graph database having vertices connected by edges, comprising:

defining vertices of subgraphs in the graph database using a database view wherein at least some of the vertices and edges are defined both statically through defined vertices and induced edges, and dynamically through a set of vertices and edges that are defined algorithmically;

combining the subgraphs in combinations using set operators to create a desired subgraph implemented at least partially by an algorithmic process; and performing a query on the desired subgraph using a graph traversal language that allows the query to specifically choose vertices and by induction edges that have certain relationships to a specific vertex.

2. The method of claim 1 further comprising defining a spanning edge that connects at least one vertex that should be included in the desired subgraph but is two or more edges away from another vertex in the desired subgraph.

3. The method of claim 1 wherein each subgraph comprises a plurality of vertices and edges to store database data, wherein records are stored in the vertices, and the edges comprise typed, directed arcs, and further wherein each vertex and edge has named attributes referred to as properties.

4. The method of claim 1 wherein the graph database is utilized in a large-scale computer storage system in which backup servers and data storage devices comprise the vertices, and network links between the servers and storage devices comprise the edges.

5. The method of claim 4 wherein the large-scale computer storage system comprising a set of multi-level primary storage devices and a set of protection storage devices distributed at geographically separate locations.

6. The method of claim 5 wherein the primary storage comprises virtualized storage devices operated by one or more virtualized storage servers, and wherein the protection storage devices comprise Data Domain systems using a Data Domain Operating System for deduplicated data backup and restoration.

7. The method of claim 6 wherein the dynamic subgraphs define regions within a subgraph of a particular data storage resource such that a subgraph defines a virtualized storage server site with Data Domain devices at a local site, as well as Data Domain devices at one other geographically distributed site.

8. The method of claim 7 wherein the system includes a server executing a data backup and replication program that provides disaster recovery operations, and wherein the dynamic subgraphs provide specific locations of the data storage devices through subgraphs that define which devices are where in the entire system to allow for efficient and quick disaster recovery processes by allowing data that is stored at a virtualized storage site to be immediately started up at a secondary site to keep the enterprise in operation based on the Data Domain devices in one or more regional subgraphs.

9. The method of claim 1 wherein the database view comprises a result set of a stored query on the data of the graph database in a virtual table computed dynamically from the data when access to the database view is requested through an appropriate query command, and which does not form part of a physical schema.

10. The method of claim 9 wherein the graph traversal language comprises a host computer language that supports function composition and function nesting.

11. The method of claim 9 wherein changes applied to the data in a corresponding table are reflected in subsequent data shown in corresponding subsequent invocations of the database view.

12. A system for implementing dynamic subgraphs in a graph database having vertices connected by edges, comprising:
- a first component defining vertices of subgraphs in the graph database using a database view wherein at least some of the vertices and edges are defined both statically through defined vertices and induced edges, and dynamically through a set of vertices and edges that are defined algorithmically, and combining the subgraphs in combinations using set operators to create a desired subgraph implemented at least partially by an algorithmic process; and
- a second component performing a query on the desired subgraph using a graph traversal language that allows the query to specifically choose vertices and by induction edges that have certain relationships to a specific vertex.

13. The system of claim 12 further comprising a third component defining a spanning edge that connects at least one vertex that should be included in the desired subgraph but is two or more edges away from another vertex in the desired subgraph.

14. The system of claim 12 wherein each subgraph comprises a plurality of vertices and edges to store database data, wherein records are stored in the vertices, and the edges comprise typed, directed arcs, and further wherein each vertex and edge has named attributes referred to as properties.

15. The system of claim 12 wherein the graph database is utilized in a large-scale computer storage system in which backup servers and data storage devices comprise the vertices, and network links between the servers and storage devices comprise the edges.

16. The system of claim 12 wherein the database view comprises a result set of a stored query on the data of the graph database in a virtual table computed dynamically from the data when access to the database view is requested through an appropriate query command, and which does not form part of a physical schema.

17. The system of claim 16 wherein changes applied to the data in a corresponding table are reflected in subsequent data shown in corresponding subsequent invocations of the database view.

18. A computer program product, comprising a non-transitory computer-readable medium having a computer-readable program code embodied therein, the computer-readable program code adapted to execute a method of implementing dynamic subgraphs in a graph database, comprising:
- defining vertices of subgraphs in the graph database using a database view wherein at least some of the vertices and edges are defined both statically through defined vertices and induced edges, and dynamically through a set of vertices and edges that are defined algorithmically;
- combining the subgraphs in combinations using set operators to create a desired subgraph implemented at least partially by an algorithmic process; and
- performing a query on the desired subgraph using a graph traversal language that allows the query to specifically choose vertices and by induction edges that have certain relationships to a specific vertex.

19. The computer program product of claim 18 wherein the method further comprises defining a spanning edge that connects at least one vertex that should be included in the desired subgraph but is two or more edges away from another vertex in the desired subgraph, and further wherein the database view comprises a result set of a stored query on the data of the graph database in a virtual table computed dynamically from the data when access to the database view is requested through an appropriate query command, and which does not form part of a physical schema, and changes applied to the data in a corresponding table are reflected in subsequent data shown in corresponding subsequent invocations of the database view.

* * * * *